United States Patent [19]
Schmidt

[11] Patent Number: 6,007,303
[45] Date of Patent: Dec. 28, 1999

[54] CONTROLLABLE COOLANT PUMP FOR MOTOR VEHICLES

[76] Inventor: Eugen Schmidt, Schwarzbacher Strasse 28, 98673 Merbelsrod/Thüringen, Germany

[21] Appl. No.: 09/010,904

[22] Filed: Jan. 22, 1998

[30] Foreign Application Priority Data

Jan. 22, 1997 [DE] Germany .......................... 197 02 000
Oct. 21, 1997 [DE] Germany .......................... 197 46 359

[51] Int. Cl.$^6$ .................................................. F04B 49/00
[52] U.S. Cl. .................... 417/223; 123/41.47; 192/84.93
[58] Field of Search ............................ 123/41.47, 41.44, 123/41.198 C, 41.17; 192/84.1, 84.93, 84.96, 110 B, 110 S, 20; 310/92, 103, 104, 105; 417/223, 420

[56] References Cited

U.S. PATENT DOCUMENTS

| | | | |
|---|---|---|---|
| 3,354,833 | 11/1967 | Laing | 103/87 |
| 4,285,421 | 8/1981 | Halsted | 192/84.96 |
| 4,674,960 | 6/1987 | Rando et al. | 417/420 |
| 4,982,825 | 1/1991 | Sekella | 192/20 |
| 5,172,798 | 12/1992 | Mabee | 12/192 |
| 5,188,065 | 2/1993 | Lyndhurst et al. | 123/41.44 |
| 5,477,094 | 12/1995 | Lamb | 310/75 D |
| 5,775,583 | 7/1998 | Braatz et al. | 237/12.3 D |

FOREIGN PATENT DOCUMENTS

| | | |
|---|---|---|
| 66334 | 5/1969 | Germany . |
| 3819180 | 12/1986 | Germany . |
| 3643565 | 7/1987 | Germany . |
| 4110488 | 11/1991 | Germany . |
| 4121344 | 1/1993 | Germany . |
| 4203391 | 8/1993 | Germany . |
| 4325627 | 2/1995 | Germany . |
| 4335340 | 4/1995 | Germany . |
| 4409537 | 9/1995 | Germany . |
| 4436879 | 4/1996 | Germany . |

*Primary Examiner*—Erick R. Solis
*Assistant Examiner*—Mahmoud M Gimie
*Attorney, Agent, or Firm*—Collard & Roe, P.C.

[57] ABSTRACT

A controllable motor vehicle coolant pump driven by an internal combustion engine via a belt pulley connected to a driving shaft. The pump does not require a shaft seal for sealing the flow chamber against the bearing casing of the driving belt pulley, and reduces fuel consumption and exhaust gas emission during the entire operating range of the engine. The pump comprises two opposing clutch halves mounted on two clutch shafts. The impeller of the coolant pump is driven by a permanently magnetic clutch. One clutch half is comprised of a multipole magnetic disc magnetized in sectors on one of the two clutch shafts. The other clutch half comprises a disk made of hysteresis material or a disk with a copper disc arranged therein mounted on the other clutch shaft. The width of the air gap between the two clutch halves is variable depending on the given operational condition of the engine.

12 Claims, 10 Drawing Sheets

6,007,303

CONTROLLABLE COOLANT PUMP FOR MOTOR VEHICLES

BACKGROUND OF THE INVENTION

1. Field of the Invention

The invention relates to a pump. In particular, the invention relates to a controllable coolant pump for motor vehicles, which is directly driven by the vehicle's internal combustion engine via a pulley.

2. The Prior Art

Rotary coolant pumps are generally used with water-cooled internal combustion engines. Their bearing shafts are directly driven by the crankshaft of the engine, for example, by tooth belts. With many of these known coolant pumps, the flow chamber is formed in the cylinder crankcase of the internal combustion engine. The bearing casing of the bearing shaft, on whose free end the impeller of the rotary pump is mounted, is detachably connected to the housing of the internal combustion engine. The pulley is arranged on a bearing shaft on one side and the impeller of the rotary pump on the other side. Therefore, the speed or rpm's of the pulley always corresponds with the speed of the impeller of the coolant pump, and is proportional to the given speed of the engine. Shaft seals must be provided on the bearing shaft to seal the flow chamber against the casing of the bearing.

Many kinds of different sealing arrangements for coolant pumps are known in the art. For example, German patents DE 38 19 180, DE 42 03 391, DE 44 09 537 and DE 44 36 879 describe different designs of sealing arrangements. All of the designs described in these patents have sealing units with a sliding ring seal surrounding the bearing shaft for sealing the casing of the bearing against the flow chamber. The sliding ring must rest against a counter ring under the force of at least one pressure spring to ensure that the seal is tight. Therefore, the known sealing units are comprised of a number of different functional assemblies, which are expensive to assemble and/or manufacture, and which are necessarily susceptible to malfunctioning.

Another possibility for reducing problems and for sealing a flow chamber against the driving side has been described, in DD 66 334, U.S. Pat. No. 3,354,833, U.S. Pat. No. 4,674,960 and German Patent DE 41 21 344. These devices employ permanent magnetic rotary front clutches. Two axial multi-pole round magnets magnetized in sectors oppose each other. Since these permanent magnetic rotary front clutches are always synchromesh units, their significant drawback is that the coupling slips when the maximally transmittable moment is exceeded. Such clutches can be re-engaged only after the drive has been stopped. Permanent magnetic rotary front clutches are therefore extremely unsuitable for directly driving a coolant pump of a motor vehicle. For this reason, they have not achieved successful practical application for direct drives.

However, the text of German patent DE 41 21 344 and also the figures of U.S. Pat. No. 3,354,833 show that electric motors, e.g. with electronic controls, are preferably employed for driving rotary front clutches. Such motors then permit gradual start-up as well. Based on the design shown in FIG. 1 of German Patent DE 36 43 565, this device, having a magnetic clutch and direct drive of the water pump impeller, also has the drawback in that the clutch slips when the maximally transmittable torque is exceeded, in addition to having a very low maximally transmittable torque. The design shown in FIG. 2 of that reference does in fact permit transmission of a higher torque. However, due to the type of bearing for the pump impeller, this design leads to elastic deformation of the separation wall and interference with the operational performance.

For this reason, the permanent magnetic central rotary clutch introduced in German Patent DE 41 10 488 was proposed, especially for driving circulating cooling water pumps for motor vehicles. With such designs, the pump impeller is driven by a ring magnet supported within a pot-shaped pump housing. In spite of the fact that the maximally transmittable torque is higher because of the permanent magnets arranged around the circumference, this central rotary clutch is also a synchromesh unit with all the drawbacks described above. In order to prevent an unintentional slipping of clutches of this type for coolant pumps in motor vehicles, these clutches are equipped with additional electric drives as well. Of course, coolant pumps equipped with their own drive can be controlled quite efficiently. However, their space requirements are increased, and they are relatively expensive to manufacture.

A variation of a coolant pump with variable delivery, which is somewhat less expensive, is shown in German Patent DE 43 25 627 and DE 43 35 340. These variations are coolant pumps with a depressive or decreasing delivery system, which are directly driven by the crankshaft. Here, the impeller of the coolant pump is driven not directly by the belt drive, which is depends upon the speed of the engine, but by a known interconnected fluid friction clutch. This clutch is capable of "down"-control at certain excessively high rpms, at which point the depressive delivery behavior improves the cavitation behavior of the coolant circulation by limiting the overall flow volume. According to another embodiment of the invention, this fluid friction clutch can be controlled on the water side depending on the temperature of the coolant. This means that the impeller drive is operated only at a defined idle running speed when the engine is cold, and engages with depressive delivery system depending upon the speed of the engine, only after the coolant reaches a certain temperature.

A significant disadvantage of this controllable coolant engine driven pump having a fluid friction clutch lies in its susceptibility to failure. This potential susceptibility to breakdown of the fluid clutch-controlled coolant pump system is due to the fact that the clutch chamber must be sealed against the flow chamber with a coolant liquid, such as with a silicone oil. If this seal becomes defective during the course of operation, cooling liquid enters the clutch chamber and leads to total failure of the coolant pump, and thus necessarily to total breakdown of the engine.

All other pumps known in the state of art with direct drive by the crankshaft are immediately engaged in the warm-up running phase of the engine. At this time, they start to dissipate the heat generated in the engine, when this heat is urgently needed during the warm-up running phase. As forced cooling is immediately started, the warm-up running phase of the engine is necessarily prolonged. At the same time, this forced cooling, which starts immediately during the warm-up phase leads an to increased fuel consumption in addition to an increase in the emission of exhaust gases. Furthermore, this driving output of the coolant pump, which is not absolutely required for cooling, always results in an increased fuel consumption. This driving output, however, is not equired in this operating condition.

SUMMARY OF THE INVENTION

It is therefore an object of the present invention to provide a pump, in particular a coolant pump for motor vehicles, which does not have the drawbacks of the prior art. The pump is directly driven by the crankshaft of the internal combustion engine, for example, via a belt drive. The belt drive does not require a shaft seal for sealing the flow chamber against the bearing casing of the driving belt pulley. The pump according to the invention is safe and reliable as well as inexpensive to manufacture and assemble. This pump distinctly reduces both the emission of exhaust gases and fuel consumption throughout the entire operating range of the engine.

On the driven side, torques up to a maximum torque remaining constant within the entire range of speed can be transmitted to the impeller, starting even at low relative speeds. The clutch defined by the invention produces a transmission of torque that distinctly enhances the cavitation behavior of the coolant pump. With a constant air gap, a relatively high torque can be transmitted to the impeller even at low relative rpms, and an even greater torque can be transmitted as the relative speed increases. The torque transmittable to the impeller first increases linearly with the rpms. However, at higher rpms, the increase in the transmittable torque diminishes due to the increased temperature of the clutch disks.

Due to the spacial separation of the bearing casing by a nonmagnetic separation wall, such as a cover, an optimal, rugged and reliable sealing of the flow chamber against the driving side of the water pump is achieved without employing a shaft seal, and with minimal manufacturing and assembly expenditure. The direct drive of one half of the clutch ensures a speed that is always proportional to the speed of the engine. By varying the air gap between the two clutch halves, the instantaneous speed of the pump and thus its delivery, are infinitely variable independent of the speed of the crankshaft. This rate can be varied with suitable control technology, depending on the given operational condition of the internal combustion engine.

The impeller of the coolant pump can be driven by a special permanent magnetic clutch according to the invention. Copper material is arranged adjacent to the hysteresis material of the second clutch half on one or both sides. The revolving segments of the magnetic ring generate voltages in the copper material, resulting in eddy currents. The hysteresis ring (AlNiCo) is arranged in front of, behind or between the copper material and provides a magnetic feedback and intensifies the magnetic field built up by the eddy currents in the copper disk. The intensity of the eddy currents and thus the quantity of the transmittable torque rise at a constant temperature of the clutch subassemblies with a nearly linear curve as the speed increases.

A venting wheel joined with the driving shaft may be arranged near the clutch half connected with the driving shaft. This venting wheel and the venting slots arranged on the casing of the bearing jointly serve to dissipate heat and thus increase the maximally transmittable torque.

The two opposing active surfaces of the permanently magnetic clutch with the spacing therebetween can be designed with symmetric surface shapes. However, different designs of the clutch in any desired rotation-symmetric bodies or elements are possible as well. For example, paraboloids, cones or cylinder jackets or circular disks are possible, including combinations of the feasible surface shapes specified above.

By specifically selecting special geometric forms, the structural size of the clutch is optimized, depending on the transmission capacity required in a given case for efficiently transmitting the axial and radial forces of the clutch.

The width of the air gap between the two clutch halves varies depending upon the given operational condition of the engine. A bearing should be present in a coolant pump housing, in which the driving shaft of the coolant pump is rotatably supported. The driving disk of the coolant pump is rigidly arranged on one side of the bearing within one area of the driving shaft. One of the two clutch halves of the permanent magnetic clutch is arranged on the other side of the bearing within another area of the driving shaft, (the clutch shaft), by an axially displaceable shaft-and-hub connection. The clutch shaft can be designed in the form of a wedge-shaped or toothed shaft. It is therefore possible to vary the width of the air gap between the two halves of the clutch depending on the given operational condition of the engine.

A setting ring can be arranged on the axially displaceable clutch half. The setting ring is supported in an antifriction bearing and is engaged by an actuation lever pivotally mounted in the coolant pump housing and projecting into an adjustment unit. The actuation lever pivotally mounted in the coolant pump housing enables one to infinitely vary the position of the movable clutch disk on the clutch shaft, which may be a wedge-type or toothed shaft. This is possible by employing a zero-drive arranged in the adjustment unit, or by a solenoid mounted on the lifting unit.

Therefore, it is possible through simple and inexpensive technical means to continuously control the delivery of the coolant pump at any driving speed by a defined, infinite variation of the air gap between the two halves of the clutch. The coolant instantaneously required by the engine can consequently be made available by the coolant pump of the invention in a controlled manner as required.

During the warm-up running phase of the engine, it is therefore possible to minimize the amount of delivery of the water pump and thus to significantly reduce the warm-up phase of the engine. This also reduces exhaust gas emission during the warm-up phase, and also reduces fuel consumption.

Due to variation of the delivery of the coolant pump within the full range of rpm's of the crankshaft, the delivery of the pump can always be adapted to the operational condition of the engine. The driving power withdrawn by the coolant pump from the overall system is significantly reduced and the fuel consumption is consequently notably lowered even more.

A prestressed pressure spring may be mounted on the clutch shaft, between the collar backing the water pump bearing and the axially displaceable half of the clutch connected with the antifriction bearing-supported setting ring. This prestressed pressure spring ensures an exact and safe fixation of the position of the actuation lever on or in the antifriction bearing-supported setting ring during each phase of the adjustment. The spring thus exactly fixes the position of the movable clutch disk on the clutch shaft. This in turn ensures a defined adjustment of the speed during each phase of adjustment.

The nonmagnetic separation wall, i.e., the cover, may be supported against the driving shaft by a thrust bearing, especially with higher driving outputs. This avoids malfunctioning resulting from uncontrolled changes in the gap. The reliability of the pump is therefore always fully ensured, even when maximum output is transmitted.

A journal pin with a stop collar may be arranged in or on the cover. The impeller having associated clutch assemblies rotatably supported by a journal bearing bushing is secured against axial displacement on the cover. To accomplish this, a safety ring is mounted at the free end of the journal pin, and stop disk is arranged between the safety ring and the journal bearing bushing of the impeller. The pump according to the invention prevents any unintended further enlargement of the air gap, even with a very large spacing between the two halves of the clutch, which could otherwise lead to stoppage of the impeller with the engine running. Therefore, a defined re-engagement is ensured at any time.

A journal bearing bushing may also be arranged in the cover, wherein the abutment with the impeller and associated clutch assemblies are supported both axially and radially. This journal bearing bushing is preferably inserted in a bearing receptacle shaped by molding in the center of the cover. Such one-sided support of the impeller in the bearing receptacle is made possible by the arrangement of the bearing within the range of power of the permanent magnetic clutch of the invention. The magnetic force of the clutch can be therefore exploited for producing the required force to retain the bearing, and thus secures the position of the impeller with all of the assemblies arranged thereon in the journal bearing bushing.

In special application cases, in particular where the driving output is lower, this solution avoids costly additional constructions for producing the bearing retaining force required in the operating condition of the journal bearing. The bearing retainer shaped in the cover, together with the journal bearing bushing arranged therein stabilizes the overall geometry of the cover with a minimized thickness of the cover wall. Moreover, the arrangement of the journal bearing bushing ensures safe transmission of the bearing stresses to the bearing casing.

The design of the bearing site in the flow chamber of the cylinder crankcase ensures a flow of cooling liquid around the journal bearing for cooling the bearing. At the same time, the coefficient of friction of the bearing is reduced, wear is minimized, and the reliability of the entire bearing assembly is distinctly increased.

Since at higher relative rates of revolution the transmitted torque decreases with the increase in temperature of the magnet, the permanent magnet is arranged between the abutment and the impeller in the cooling medium. This offers the advantage that heating of the magnet, which increases with rising relative rates of revolution, is minimized by the flow of cooling medium around the magnet.

The continuous cooling of the magnet maintains a constant transmittable torque, even at higher relative rates of revolution, and the maximally transmittable torque and maximal delivery of the coolant pump are distinctly improved.

Another feature of the invention is that especially with "pure" hysteresis clutches, an impeller coated with hysteresis material by injection molding may be arranged on the free end of the insert bushing facing the flow chamber of the pump.

A thrust magnet disposed opposite the clutch shaft on the driving side may be arranged near the nonmagnetic separation wall or cover on the rotatably supported impeller. This centric thrust magnet, if the above-described journal bearing bushing is employed, prevents unintended further enlargement of the air gap, even if the spacing between the two clutch halves is very large, which could lead to standstill of the impeller with the engine running. Due to the arrangement of the thrust magnet as defined by the invention, re-engagement of the clutch is always ensured.

A sensor for detecting the instantaneous speed of the impeller, and an adjustment unit for changing the air gap between the halves of the clutch, are arranged on the bearing casing. This sensor, which can be a Hall sensor, is preferably arranged on the bearing casing on the "air side". The sensor, of course, may be installed also on the "water side". However, arranging the sensor on the "air side" offers the advantage that the sensor does not have to be sealed, and that leaks generally can be avoided. By detecting the speed of the impeller with a sensor, the operation of the internal combustion engine in association with the controllability of the coolant pump of the invention via the adjustment unit can change the air gap in a defined manner. This can occur by displacing one clutch half on the driving shaft to change the transmission torque of the clutch, and change the speed of the impeller so as to control the flow volume.

With the pump according to the invention, the coolant flow volume remains constant in the presence of continuously changing engine speeds. It is also possible to achieve standstill of the impeller by adjusting a maximally possible gap, such as during the warm-up phase.

Due to the controllability of the impeller speed, the impeller can be deliberately "over-dimensioned", since no negative effects are expected during operation with the present invention. Furthermore, as mentioned before, the coolant pump defined by the invention leads to noticeable power output savings, which in turn result in fuel savings.

The invention thus allows for demand-or-requirement-oriented control of the coolant pump through engine management. This means that the coolant pump defined by the invention is always supplied with only as much power as it actually requires to produce the required coolant circulation.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawing is designed for the purpose of illustration only, and not as a definition of the limits of the invention.

In the drawings, wherein similar reference characters denote similar elements throughout the several views.

DETAILED DESCRIPTION OF PREFERRED EMBODIMENTS

Figure 1:
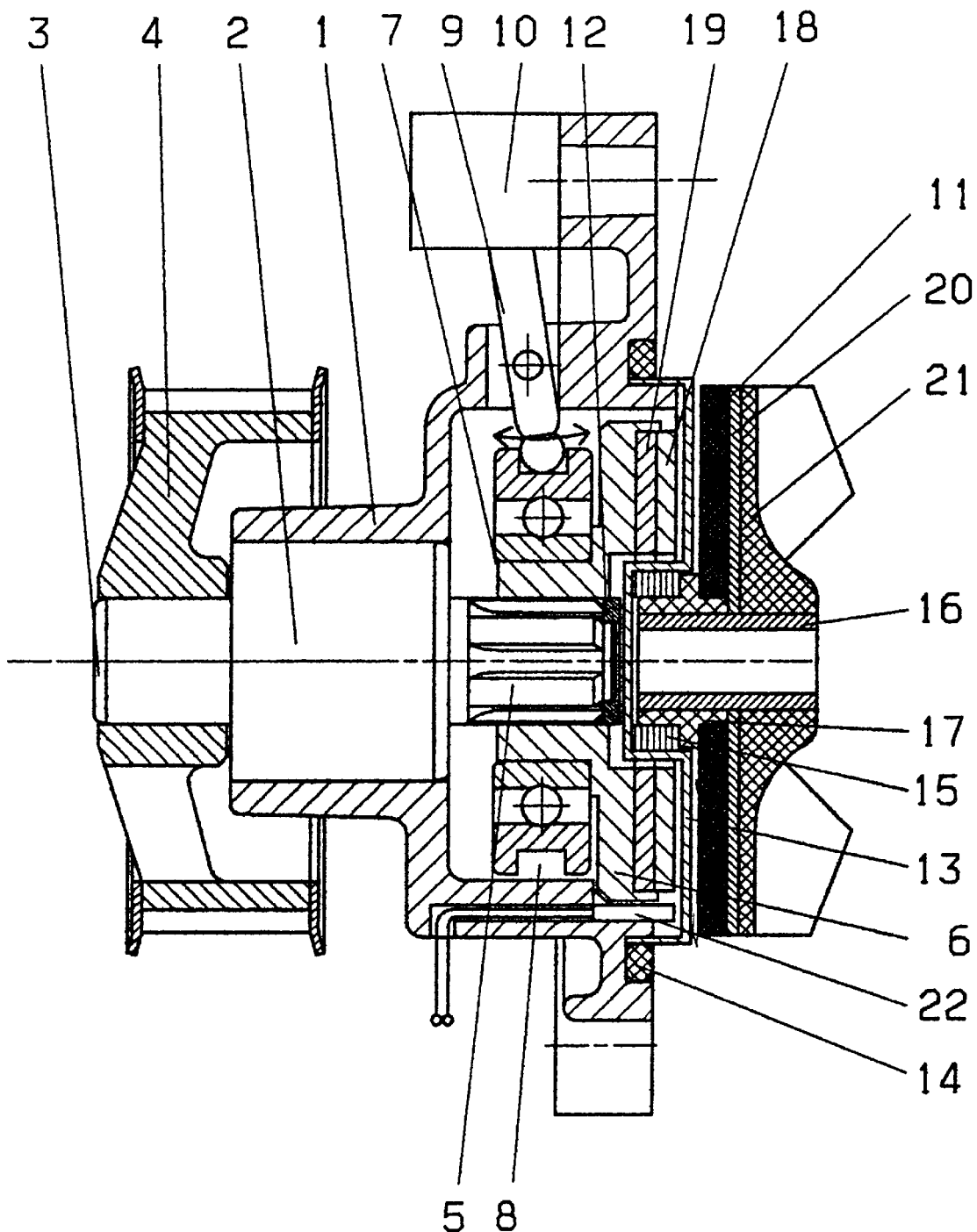
FIG. 1 is a cross-sectional view of the controllable coolant pump defined by the invention, with disk-shaped clutch halves.

Turning now in detail to the drawings, and in particular FIG. 1, there is shown one of the possible designs of the controllable coolant pump of the invention. In this embodiment, a water pump bearing 2 is arranged in a bearing casing 1. Driving shaft 3 of the coolant pump is axially and radially supported in bearing 2. A belt pulley 4 is arranged on the free end of driving shaft 3 projecting beyond bearing housing 1. At the other free end of driving shaft 3, clutch shaft 5 is designed in the form of a wedge-shaped shaft. A receiving piece 6, which is axially displaceable by up to about 10 mm, is arranged on clutch shaft 5, and a bushing provided centrically with a wedge profile is disposed in receiving piece 6. A setting ring 7 supported in an antifriction bearing and positively provided with a receiving piece is disposed on the collar of receiving piece 6, with a flute-type of groove 8 arranged in ring 7. An actuation lever 9 is pivotally mounted by a bolt fastened in the coolant pump housing and engages the flute-type groove 8. Actuation lever 9 projects in an adjustment unit 10 through an opening arranged in the coolant pump housing. The position of receiving piece 6 can be infinitely varied by lever 9 by a servo-motor or lifting magnet (not shown) arranged in adjustment unit 10.

A compound arrangement of disks consisting of a hysteresis disk 18 and a copper disk 19 rigidly joined together is arranged on receiving piece 6 on the side facing the flow chamber of pump 2.

This compound arrangement of disks 18 and 19 is positively connected with receiving piece 6, for example by casting resin. A thrust bearing 12, for example a pressure ring, is centrically arranged on clutch shaft 5 between shafts and a cover 13.

The assemblies arranged within bearing casing 1 are sealed water-tight from the flow chamber by cover 13 and gasket 14 arranged in bearing casing 1. A bearing-receiving bushing formed by molding in the center of cover 13 projects into the inner circular free space of the compounded disks 18 and 19 and abuts thrust bearing 12, which is arranged on the clutch shaft. Cover 13 itself consists of a nonmagnetic material such as aluminum or phenolic resin compound Nirosta [CrNi], with a thickness of about 0.5 to 1 mm. When receiving piece 6 is displaced axially to the maximum amount in the direction of the flow chamber, the face side of plate-like hysteresis disk 18 is spaced at least by about 0.5 mm from the adjacent circular surface of cover 13. A journal-bearing bushing 15 consisting of silicon carbide is inserted in the bush receiving the bearing on the side facing the flow chamber.

A sliding ring 17 is arranged on a insert bushing 16 and is supported in journal-bearing bushing 15. A multi-pole magnetic disk 11 magnetized in sectors abuts the other side of the stop collar of sliding ring 17. The surface of magnetic disk 11 is spaced by at least 0.5 mm from the adjacent circular surface of the cover. The stop collar of sliding ring 17, in addition to transmitting the axial and radial bearing forces, exactly fixes this defined air gap at about 0.5 mm to about 1 mm between magnetic disk 11 and the walls of cover 13.

A soft-iron disk 20 is arranged on insert bushing 16 on the side of magnetic disk 11 facing away from the cover. An impeller 21 consisting of a plastic material is arranged on insert bushing 16 as well, and is disposed adjacent to disk 20.

The segments of magnetic disk 11, which revolve when the pump is in operating condition, generate voltages in copper disk 19, resulting in eddy currents. Hysteresis disk 18, which is made of AlNiCo, is arranged in front of copper disk 19, and creates a magnetic field that is built up by the eddy currents in copper disk 19. The intensity of the eddy currents and thus also the quality of the transmittable torque increase as the relative speed increases. Due to the arrangement of the disk-like magnetic ring in the coolant as defined by the invention, increased heating of the ring as the relative speed increases can be minimized by the coolant flowing around the ring.

Due to continuous cooling of the disk-like magnetic ring, the transmission of torque is almost independent of slip i.e., there is uniform delivery despite a large amount of slip. Thus, relatively high maximally transmittable torque and optimal delivery of the coolant pump are thus ensured.

Since the magnetic field remains intact after the engine has been shut off and the air gap is set to "minimum" when the engine is not running, the position of insert bushing 16 with the assemblies arranged thereon is always safely secured with the pump according to the invention.

Thrust bearing 12 is arranged between cover 13 and clutch shaft 5, and prevents uncontrolled gap changes. In this way, it also prevents hysteresis disk 18 from running up and against the cover 13. Therefore, the reliability of the pump is always ensured by the invention, even when a high torque is transmitted.

The two halves of the permanent magnetic clutch shown in FIG. 1, i.e. the composite arrangement of disks consisting of magnetic disk 11 and soft-iron disk 20 on one side, and the composite arrangement of disks consisting of hysteresis disk 18 and a copper disk 19 on the other side, could of course be interchanged on the respective structural elements of the pump opposing one another on the two sides of cover 13.

Furthermore, a sensor 22 for detecting the given speed of impeller 21 is arranged on bearing casing 1. Detection of the speed or rpm of impeller 21 makes it possible to change the position of axially displaceable receiving piece 6. This occurs due to the electronic sensing controls of the internal combustion engine in association with the controllability of the coolant pump. Thus, it is also possible continuously change the air gap between the two clutch halves so that there is a change in the moment of transmission of the clutch, and consequently a change in the speed of the impeller.

Thus, the delivery of the pump can always be adapted to the given requirements on the engine side. It is therefore possible in the presence of a continuously changing engine speed, to achieve a constant coolant flow by a pulley driven coolant pump.

Therefore, the present invention provides a controllable coolant pump for motor vehicles, that is directly driven by the crankshaft of the internal combustion engine, for example via a belt pulley, with a distinct reduction of both the fuel consumption and emission of the exhaust gases during the running phase. However, because of the controllability of the coolant pump, only as much output is withdrawn from the driving system as is required for cooling by the entire system. This means that there is additional notable fuel savings in all phases of the engine.

Figure 2:
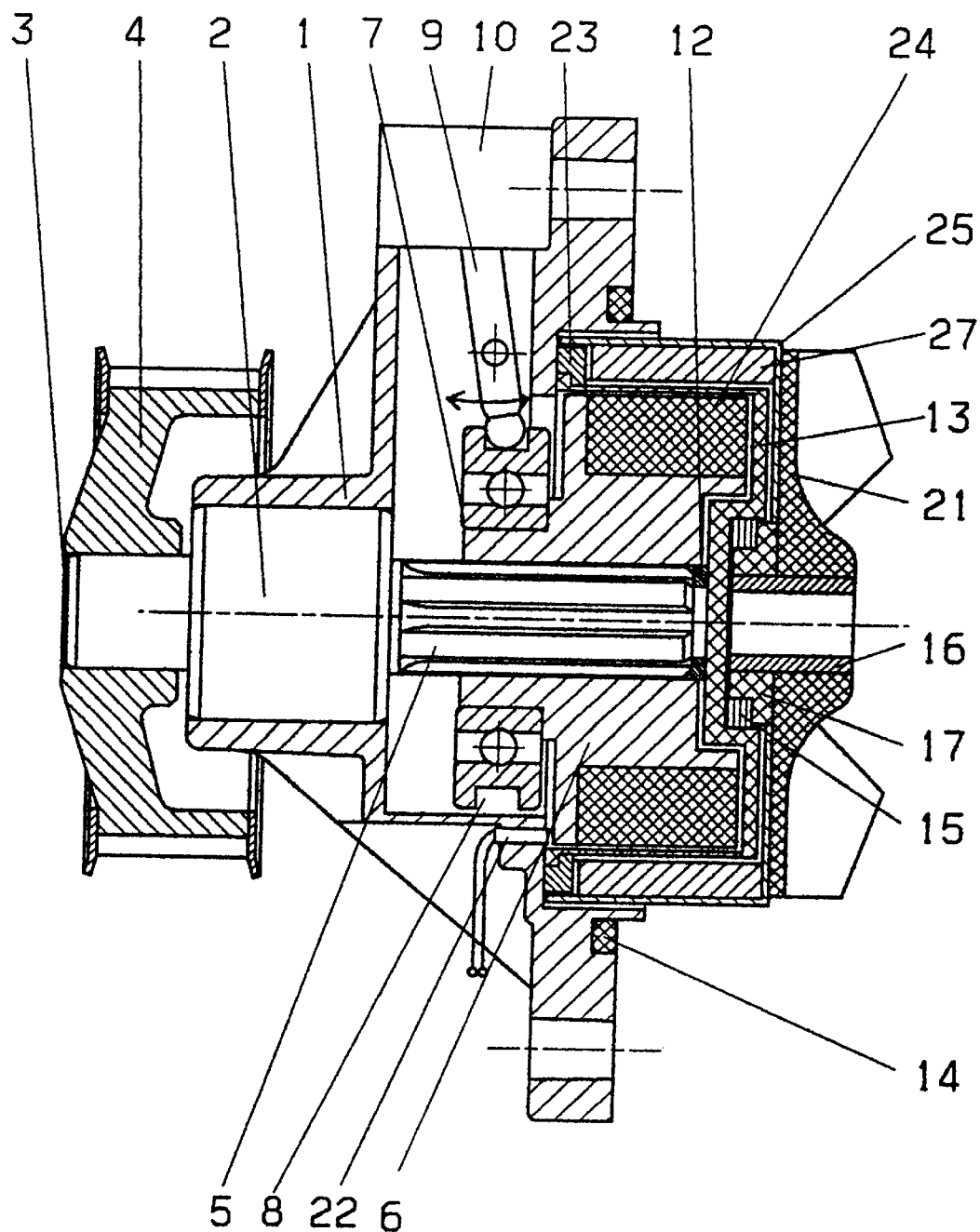
FIG. 2 is a cross-sectional view of the controllable coolant pump defined by the invention, with cylinder jacket-shaped clutch halves.

Another design of the controllable coolant pump with cylinder jacket-shaped clutch halves in shown FIG. 2. In this embodiment, a cylindrical magnetic ring 24 is disposed on the circumference of receiving piece 6. A hysteresis ring 27 is torsionally rigidly connected with impeller 21 and is disposed opposite magnetic ring 24 via a hysteresis receiving means 25 as the opposite clutch half. The poles of magnetic ring 24, which first revolve only on the driving side, cause magnetic reversal in the hysteresis material. As a result, a circumferential force is generated, which, because of its spacing from the point of rotation, results in a higher transmittable torque as compared to the embodiment shown in FIG. 1. This higher transmittable torque remains nearly constant as the relative speed rises, and improves the cavitation behavior of the coolant pump. In this embodiment, the speed or rpm is controlled by changing the surfaces of the two clutch assemblies facing each other by displacing receiving piece 6 on clutch shaft 5 as described above. The above effects can also be achieved when a higher pump delivery is required.

Figure 3:
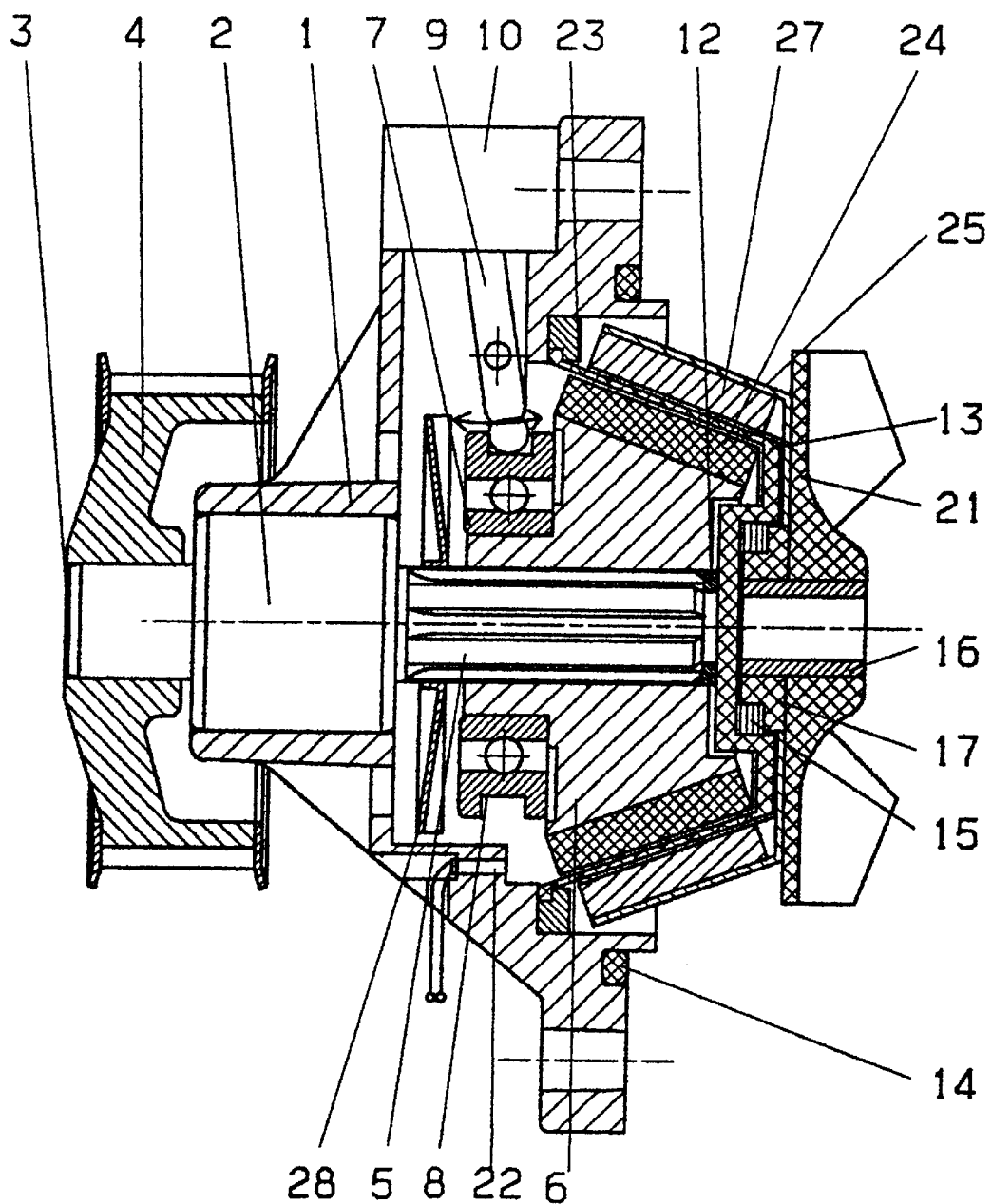
FIG. 3 is a cross-sectional view of the controllable coolant pump defined by the invention, with cone-shaped clutch halves and a venting wheel.

FIG. 3 shows a controllable coolant pump defined by the invention, with cone-shaped clutch halves and a venting wheel 28 arranged on the driving or clutch shaft 5. This design combines the advantages of the two embodiments shown in FIGS. 1 and 2. Furthermore, because of the arrangement of a venting wheel 28 connected to the driving shaft and associated with venting slots arranged in the bearing casing, optimal heat dissipation is achieved and overheating of the interior of the bearing casing is consequently avoided.

Figure 4:
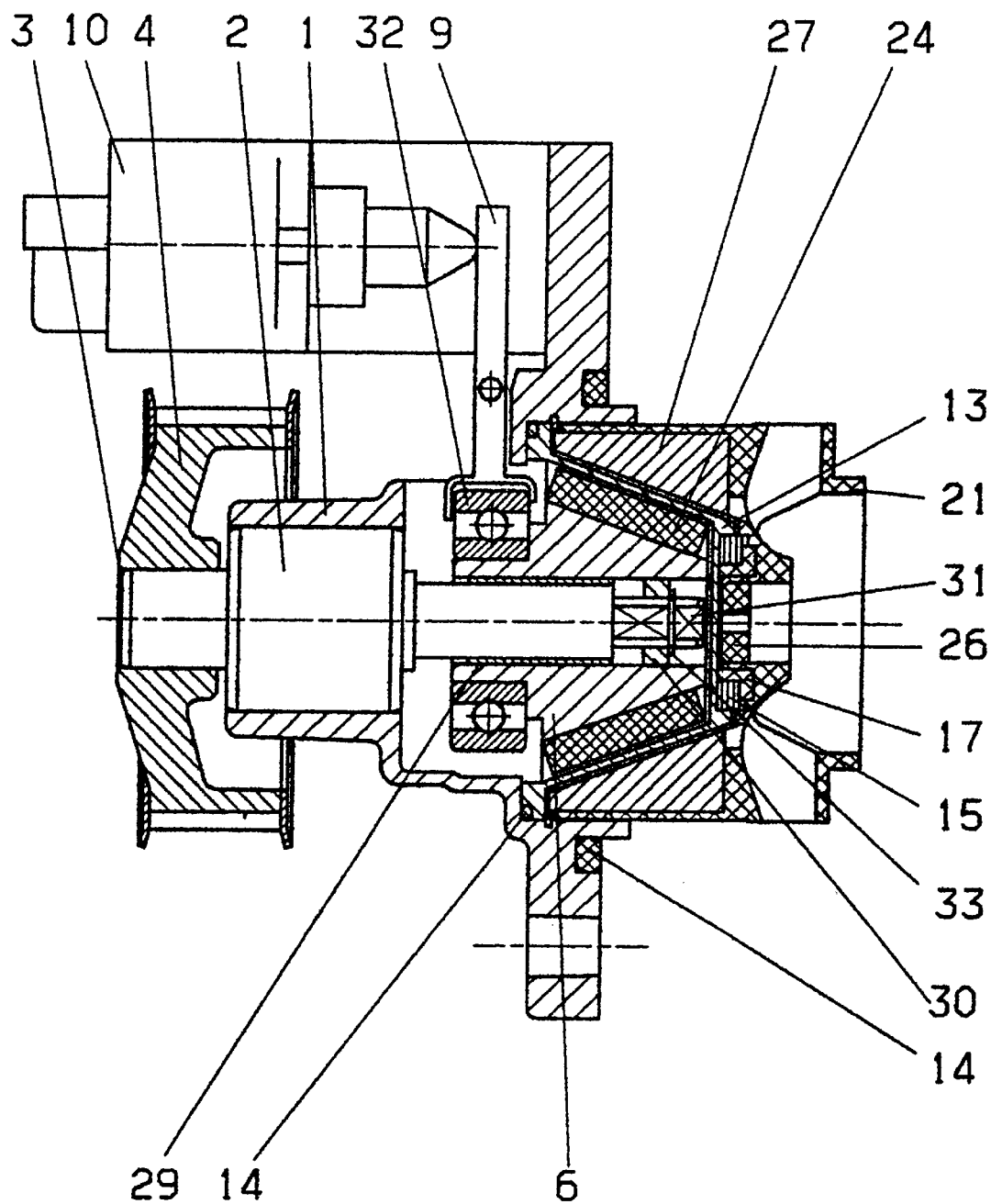
FIG. 4 is a cross-sectional view of the controllable coolant pump defined by the invention, with cone-shaped clutch halves and a centrically arranged axial magnet.

Another possible design of the controllable coolant pump defined by the invention is shown in FIG. 4. In this embodiment, which is also comprised of cone-shaped clutch halves, an axial magnet 26 is centrically arranged on the rotatably supported impeller 21. Impeller 21 has associated clutch assemblies provided thereon. Magnet 26 is arranged within the direct proximity of the nonmagnetic separation wall, i.e., cover 13.

Axial magnet 26, which is centrically arranged opposite driving shaft 3, prevents further enlargement of the air gap, even with a very large spacing between the two clutch halves, which may lead to standstill of impeller 21 with the engine running. Therefore, in the warm-up running phase of the engine, the impeller can be completely stopped with the engine running by adjusting to a maximum gap width. Due to the arrangement of an axial magnet as defined by the invention, uncontrolled enlargement of the air gap between the two clutch halves is avoided and a defined re-engagement is ensured at any time.

As shown in FIG. 4, there is a setting mechanism for the displaceable clutch half that is modified as compared to the previous embodiments. In addition to a side engagement of force by actuation lever 9 on a ball bearing 32, clutch shaft 5 is employed here which is very inexpensive. Transmission of the torque from clutch shaft 5 to receiving piece 6 is accomplished by a portion of clutch shaft 5 that is designed as a dual shaft 31. Shaft 5 has a driver 30 rigidly joined with receiving piece 6, which is axially displaceable on shaft 31. Furthermore, receiving piece 6 itself is axially displaceably supported on clutch shaft 5 by means of a journal bearing 29. To prevent the clutch assemblies arranged on axially displaceable receiving piece 6 from running up against cover 13, a safety ring 33 is mounted in this embodiment on driver shaft 31. This safety ring limits the displacement distance of driver 30 on driver shaft 31 in the direction of cover 13.

Figure 5:
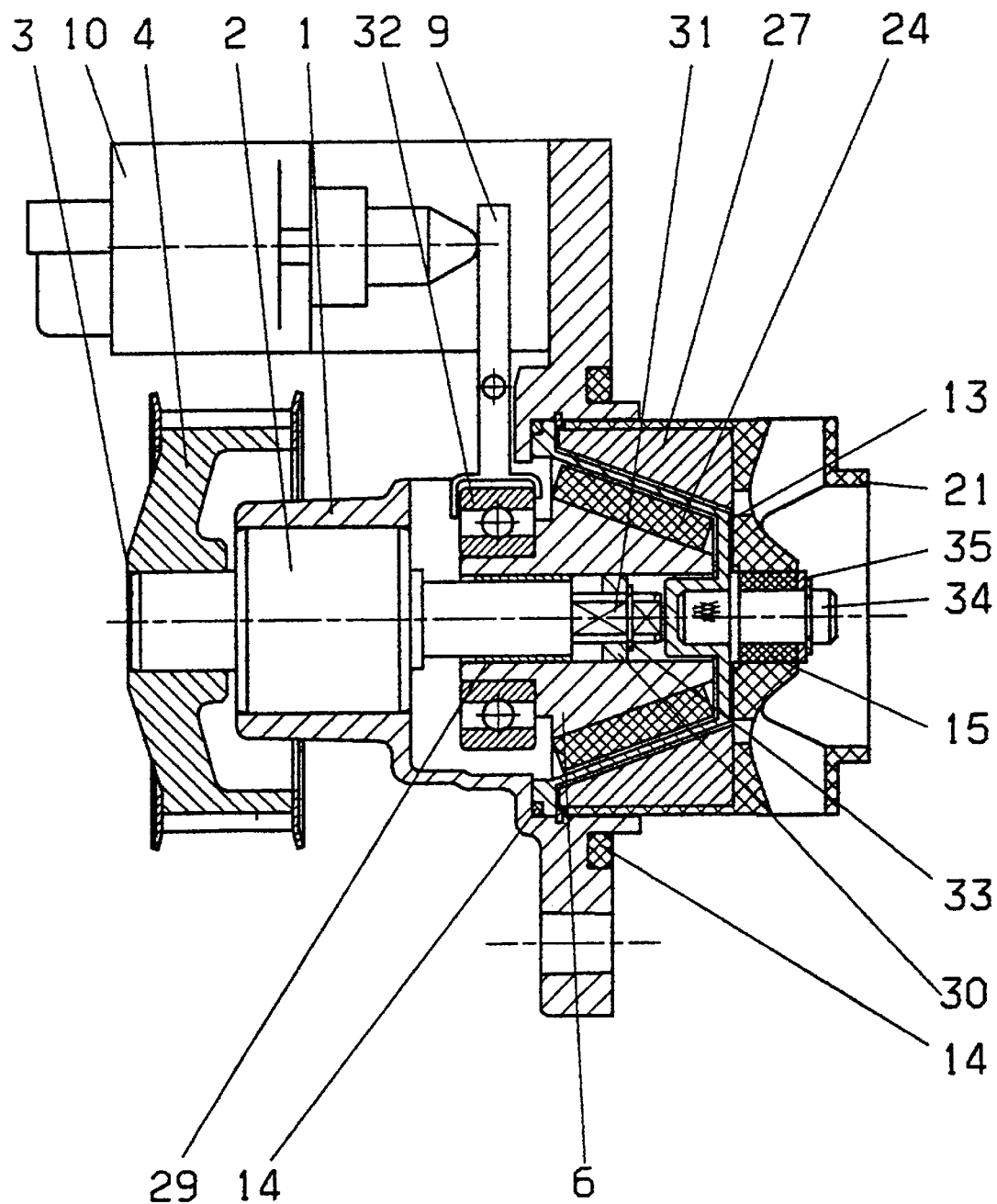
FIG. 5 is a cross-sectional view of the controllable coolant pump defined by the invention, with cone-shaped clutch halves and a impeller arranged in a journal pin.

FIG. 5 shows yet another possible embodiment of the controllable coolant pump defined by the invention, with cone-shaped clutch halves but with impeller 21 arranged on a journal pin 34. A run-up collar is arranged on the journal pin, which is anchored in the nonmagnetic separation wall, i.e., cover 13. The stop collar transmits the bearing force to cover 13 in the operating condition, and exactly fixes the defined air gap of about 0.5 mm to about 1 mm between the cone-shaped jacket of hysteresis ring 27 and the outer wall of cover 13. The axle of journal pin 34 guides impeller 21. Impeller 21 with the clutch assemblies arranged thereon is rotatably supported on journal pin 34 by a friction bearing bushing, and is secured against axial displacement in the direction of the flow chamber so that a safety ring is provided at the free end of journal pin 34. A run-up disk 35 is arranged between the safety ring and the friction bearing bushing.

With this design, it is possible to prevent a further enlargement of the air gap, even with a very large spacing between the two clutch halves, which could lead to standstill of the impeller with the engine running. Defined re-engagement can be assured in this way at any time.

Figure 6:
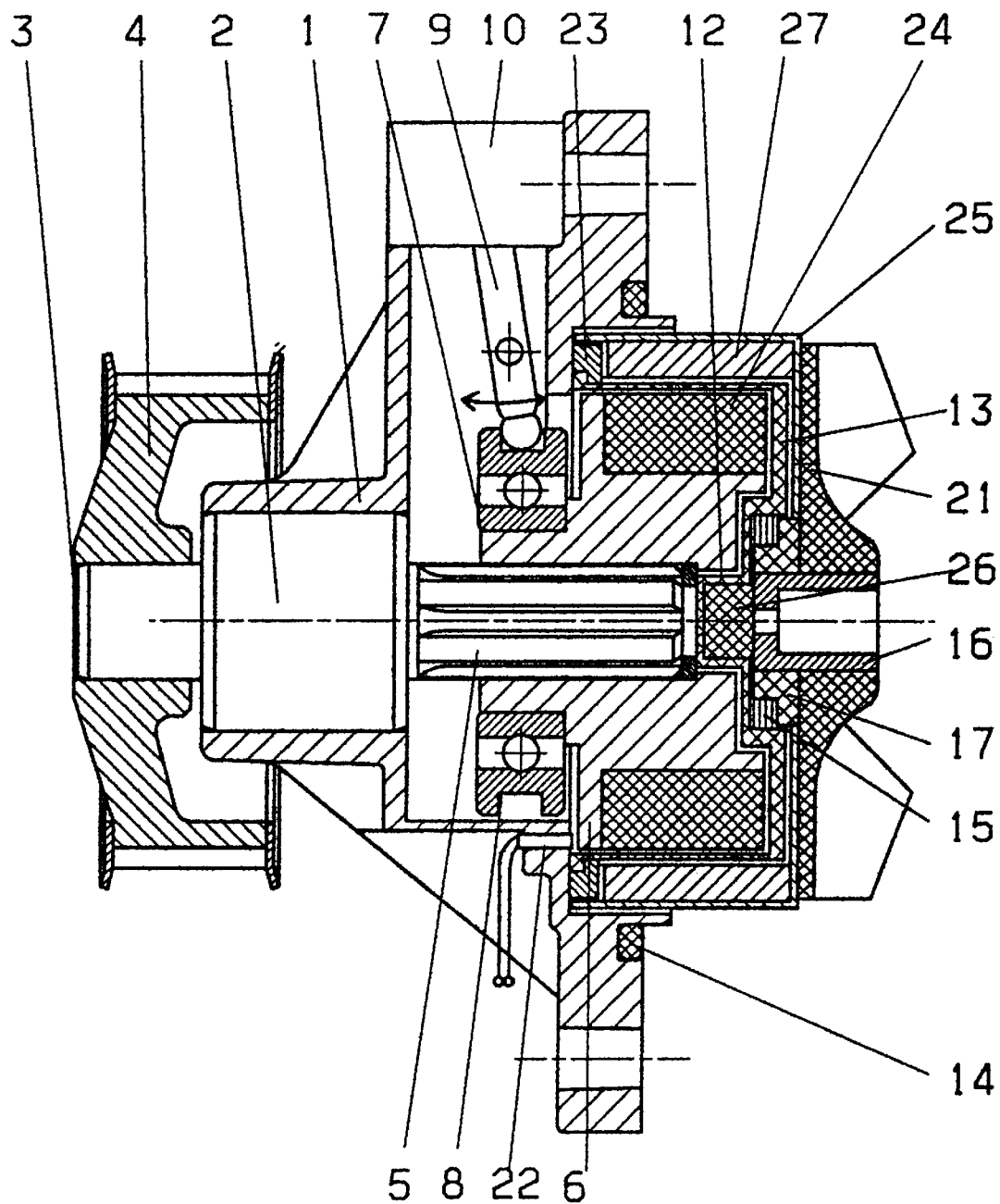
FIG. 6 is a cross-sectional view of the controllable coolant pump defined by the invention, with a jacket-shaped clutch halves and a centrically arranged axial magnet.

FIG. 6 shows another embodiment of controllable coolant pump according to the invention, with cylinder jacket-shaped clutch halves, sliding ring 17 and a centrically arranged axial magnet 26. The effects of the invention described above can be realized by this design as well.

Figure 7:
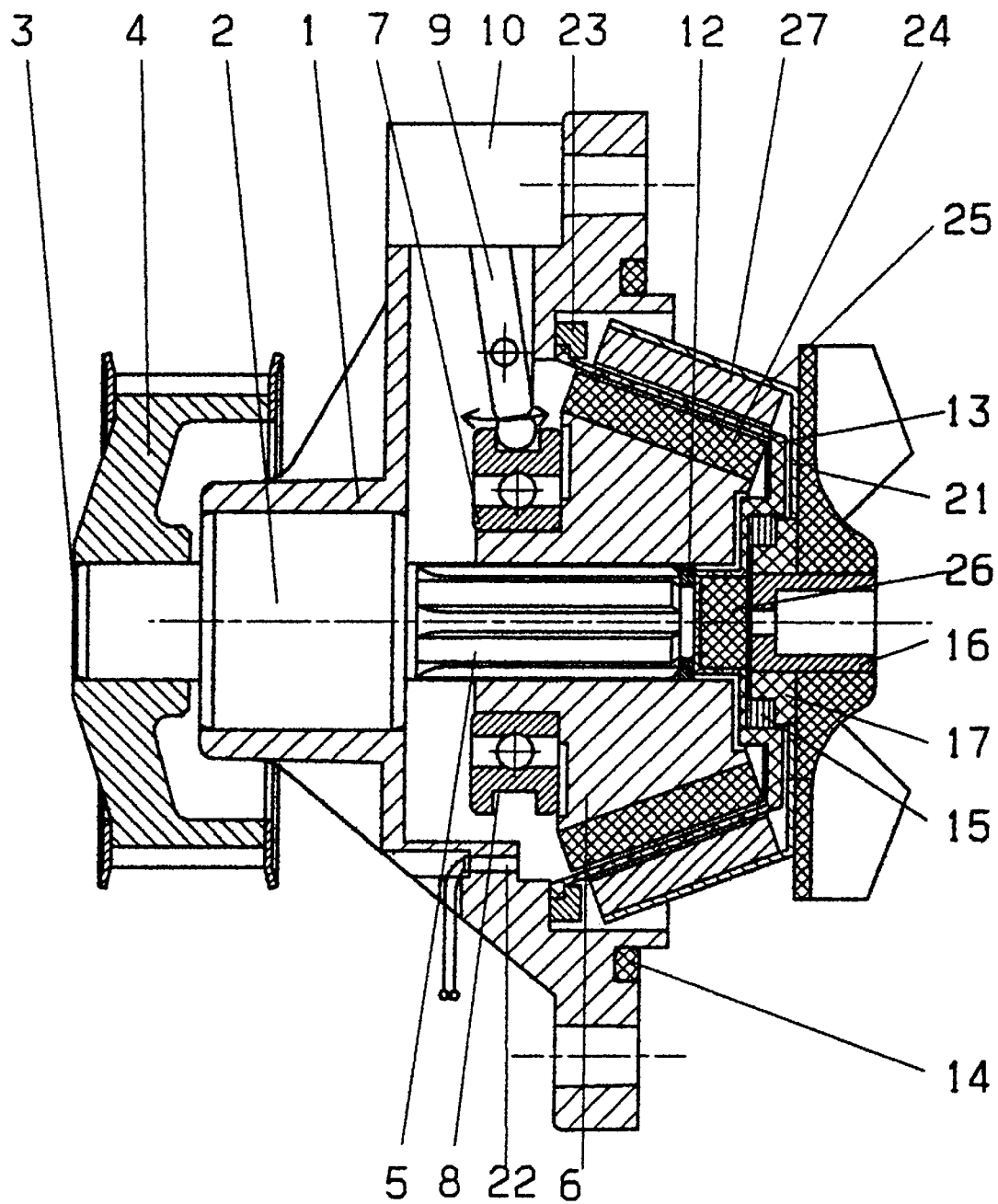
FIG. 7 is a cross-sectional view of the controllable coolant pump defined by the invention, with cone-shaped clutch halves and a centrically arranged axial magnet.

FIG. 7 shows yet another embodiment of the controllable coolant pump defined by the invention, comprising cone-shaped clutch halves, sliding ring 17, and the centrically arranged axial magnet of 26.

Figure 8:
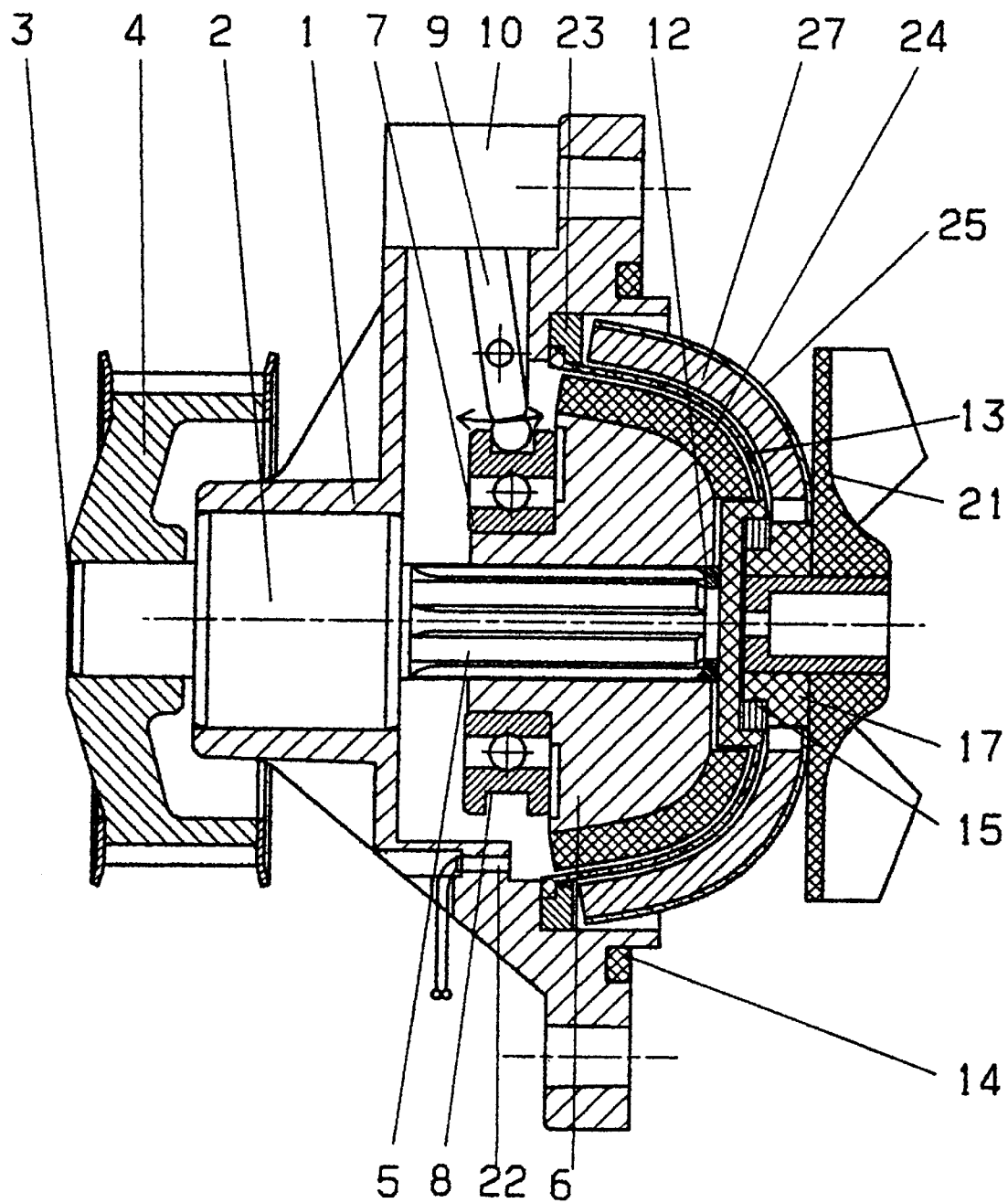
FIG. 8 is a cross-sectional view of the controllable coolant pump defined by the invention, with parabolic clutch halves.

FIG. 8 shows still another embodiment of the controllable coolant pump defined by the invention. This embodiment employs parabolically designed clutch halves both as magnetic ring 24 and hysteresis ring 27. A thrust bearing 12 is also arranged between clutch shaft 5 and cover 13.

Figure 9:
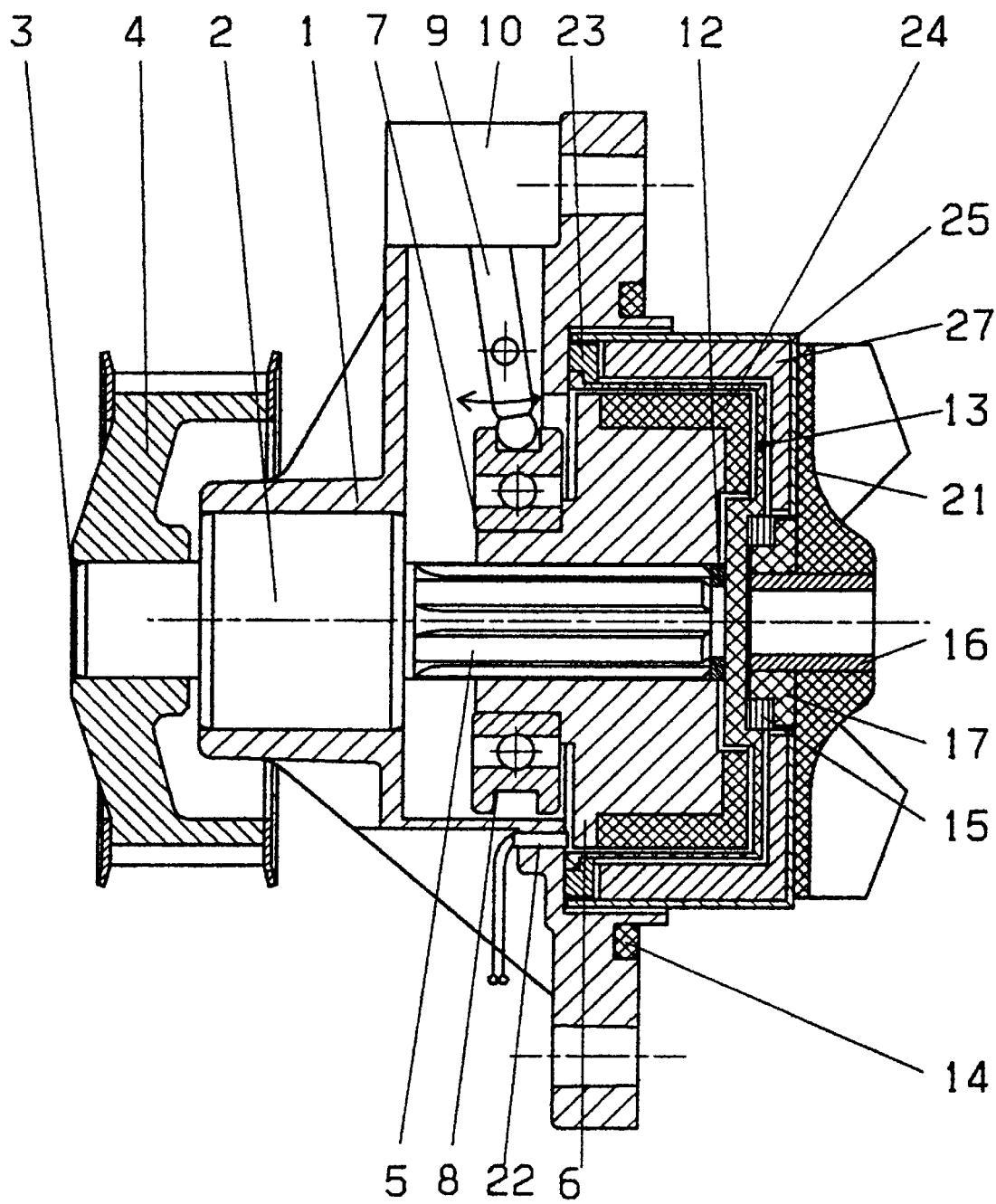
FIG. 9 is a cross-sectional view of the controllable coolant pump defined by the invention, with a combination of cylinder jacket-shaped and disk-shaped clutch halves.

FIG. 9 shows another embodiment of the controllable coolant pump defined by the invention, comprised of a combination consisting of cylinder jacket-shaped and disk-shaped clutch halves. A thrust bearing 12 is again arranged between clutch shaft 5 and cover 13.

Figure 10:
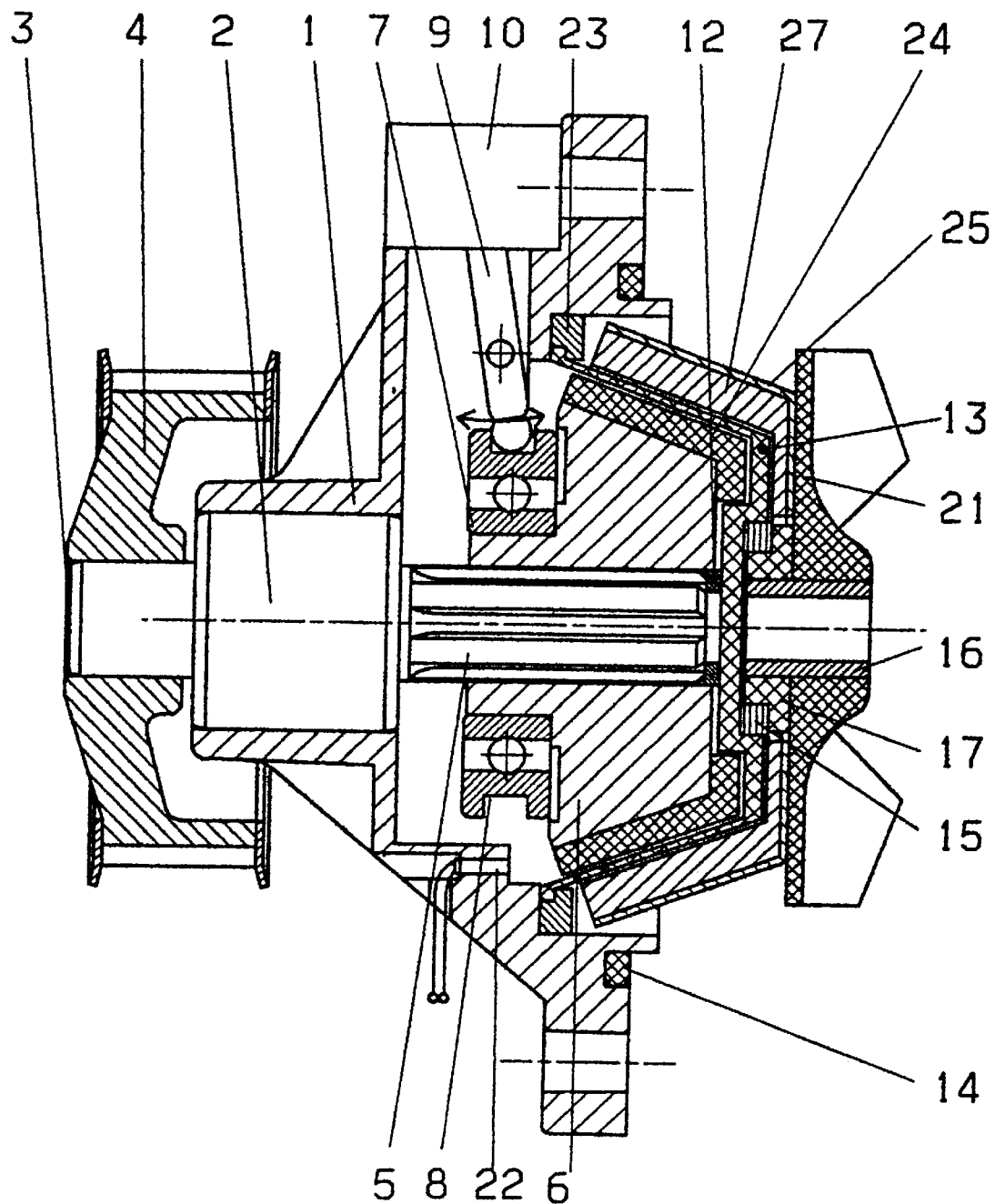
FIG. 10 is a cross-sectional view of the controllable coolant pump defined by the invention, with a combination of cone-shaped and disk-shaped clutch halves.

In addition to the possible design of the controllable coolant pump of the invention shown in FIGS. 1–9, the combination comprised of cone-shaped and disk-shaped clutch halves shown in FIG. 10 is also highly suitable for achieving specifically desired effect defined by the invention.

In general, the choice of one of the designs introduced above is made depending on the maximum structural size specified by the vehicle manufacturer, and the pump delivery to be maximally transmitted in the given case. All designs are directly driven by the crankshaft of the internal combustion engine via a belt drive, and do not require any shaft seal for sealing the flow chamber against the bearing housing of the driving pulley. These designs have high operational safety and reliability as well as minimal manufacturing and assembly expenditure. The embodiments of the invention also clearly reduce both the emission of the exhaust gases and the consumption of fuel within the entire operating range of the engine.

An additional essential aspect of the invention is that a sensor 22 is arranged on bearing casing 1. Since impeller 21 is rigidly connected to one or more multi-polar, sector-shaped, permanent magnets, it is possible to control the proper speed of impeller 21 by means of sensor 22, such as for example, by using a Hall type sensor.

Preferably, sensor 22 is arranged in bearing casing 1 in a "downstream" manner, as shown in FIGS. 1 to 3 and 6 to 10. Sensor 22 may also be installed in an "upstream" manner.

However, locating sensor 22 "downstream" has the advantage that it is not necessary to seal the sensor and/or its feed pipes. Thus, any "leaks" around the sensor are generally avoided.

Sensor 22 measures the speed of impeller 21 and is coupled to the motor computer, which also senses the temperature of the engine block. Depending upon the temperature of the engine block and the speed of the impeller, the engine computer changes the air gap of the pump by displacing one coupling half on the pump drive shaft by means of a solenoid or control 10 acting on arm 9. In this way, the volume or flow of coolant, and thus the pump capacity, is constantly adjusted to meet the respective requirements of the engine.

In the invention, by using the motor computer for the first time during the changing speed of the motor, the coolant pump provides a constant volume flow of the coolant when the pump is directly operated over a belt pulley.

Another advantage of the invention is that due to the control of the impeller speed, the impeller can be enlarged or "over-dimensioned" or designed specifically for low speed operation since during its operation, no negative effects are expected from this over-dimensioning.

Due to the control of the coolant pump of the invention, in combination with the motor computer for controlling the pump, only as much power to drive the coolant pump as is necessary is taken from the operational system for cooling the engine. This results in a considerable saving of operational output as well as a noticeable saving of fuel, and thus a simultaneous reduction of exhaust gas emission.

While several embodiments of the present invention have been shown and described, it is to be understood that many changes and modifications may be made thereunto without departing from the spirit and scope of the invention as defined in the appended claims.

What is claimed is:

1. A controllable motor vehicle coolant pump driven by an internal combustion engine via a belt pulley connected to a driving shaft, comprising:
    a first clutch half;
    a first clutch shaft connected to said first clutch half;
    a second clutch half separated from said first clutch half by an air gap, said first and second clutch halves having opposing surfaces;
    a second clutch shaft connected to said second clutch half;
    a nonmagnetic separation wall creating a water-tight separation between said first clutch half and said second clutch half;
    a plurality of multi-pole magnets magnetized by sectors arranged on said first clutch shaft; and
    a hysteresis material arranged on said second clutch half opposing the magnets on said first clutch shaft;
    so that said magnets interact with said hysteresis material to create a magnetic field for controlling the torque between said clutch halves depending upon the size of the air gap, wherein the size of the air gap between said first and second clutch halves is variable depending on the operation of the internal combustion engine.

2. The pump according to claim 1, further comprising copper material arranged adjacent the hysteresis material on at least one side of said hysteresis material.

3. The pump according to claim 1, further comprising a venting wheel connected to the driving shaft near one of said clutch halves.

4. The pump according to claim 1, wherein said opposing surfaces are symmetric relative to each other and are of a shape selected from the group consisting of paraboloids, cone jackets, cylinder jackets, circular discs and combinations thereof.

5. The pump according to claim 1, further comprising:
    a coolant pump housing pivotally supporting one of said clutch shafts;
    a bearing disposed in said coolant pump housing;
    a driving disc axially displaceably mounted on said driving shaft on one side of the bearing; and
    an axially displaceable shaft and hub connection on the other side of said bearing, said shaft and hub connection axially displaceably supporting one of said two clutch halves.

6. The pump according to claim 5, further comprising a setting ring supported in an antifriction bearing and arranged on the axially displaceable clutch half, and an actuation lever pivotally mounted in said coolant pump housing and projecting into an adjustment unit, wherein said setting ring is engageable by said actuation lever.

7. The pump according to claim 6, further comprising a prestressed pressure spring arranged on one clutch shaft between a stop collar for the bearing and the axially displaceable clutch half.

8. The pump according to claim 1, further comprising a thrust bearing supporting the nonmagnetic separation wall against the driving shaft.

9. The pump according to claim 1, further comprising:
    a journal pin having a free end and a stop collar arranged on the nonmagnetic separation wall;
    an impeller and associated clutch assemblies supported by a journal bearing bushing rotatably secured on said nonmagnetic separation wall;
    a safety ring arranged at the free end of the journal pin; and
    a stop disk arranged between the safety ring and the impeller.

10. The pump according to claim 9, wherein the journal bearing bushing is arranged in the nonmagnetic separation wall and wherein the impeller and associated clutch assemblies is supported radially and axially.

11. The pump according to claim 9, further comprising an axial magnet arranged on the impeller near the nonmagnetic separation wall.

12. The pump according to claim 9, wherein the thrust bearing has a casing, and further comprising a sensor arranged on the casing of the thrust bearing for detecting the instantaneous speed of the impeller.

* * * * *